(12) United States Patent
Smith

(10) Patent No.: US 7,029,114 B2
(45) Date of Patent: Apr. 18, 2006

(54) EYEWEAR ASSEMBLY WITH AUXILIARY FRAME AND LENS ASSEMBLY

(75) Inventor: Greg Smith, Plano, TX (US)

(73) Assignee: E'lite Optik U.S. L.P., Carrollton, TX (US)

( * ) Notice: Subject to any disclaimer, the term of this patent is extended or adjusted under 35 U.S.C. 154(b) by 0 days.

(21) Appl. No.: 10/934,917

(22) Filed: Sep. 3, 2004

(65) Prior Publication Data

US 2006/0050224 A1    Mar. 9, 2006

(51) Int. Cl.
  *G02C 9/00*    (2006.01)
(52) U.S. Cl. .......................... 351/47; 351/57
(58) Field of Classification Search .............. 351/47, 351/57, 48, 58, 44, 41, 62
  See application file for complete search history.

(56) References Cited

U.S. PATENT DOCUMENTS

| | | | |
|---|---|---|---|
| 2,920,327 A | 1/1960 | Singer | |
| 5,389,981 A | 2/1995 | Riach, Jr. | |
| 5,416,537 A | 5/1995 | Sadler | |
| 5,940,162 A | 8/1999 | Wong | |
| 6,012,811 A | 1/2000 | Chao et al. | |
| 6,053,611 A | 4/2000 | Ku | |
| 6,062,688 A | 5/2000 | Vinas | |
| 6,089,708 A | 7/2000 | Ku | |
| 6,109,747 A | 8/2000 | Chao | |
| 6,367,926 B1 | 4/2002 | Chao et al. | |
| 6,386,703 B1 * | 5/2002 | Huang | 351/57 |
| 6,412,942 B1 | 7/2002 | McKenna et al. | |
| 6,729,723 B1 | 5/2004 | Xie | |

* cited by examiner

*Primary Examiner*—Hung Xuan Dang
(74) *Attorney, Agent, or Firm*—Storm LLP; John G. Fischer

(57) ABSTRACT

An eyewear assembly comprises a primary frame assembly 100 having an outer periphery and a primary lens holder 102. At least one primary lens 106 is carried by the primary lens holder. One of a pair of arms 108 extends from a hinge 110 at each outer periphery of the primary frame assembly. An auxiliary frame assembly 200 has an outer periphery with auxiliary extensions 208 and an auxiliary lens holder 202. At least one auxiliary lens 206 is carried by the auxiliary lens holder, wherein the auxiliary frame assembly is removably secured to the primary frame assembly between the hinges and arms, so that the auxiliary lens is maintained between the primary lens and an eye of the wearer and the forward aspect of the primary assembly is undisturbed.

14 Claims, 3 Drawing Sheets

EYEWEAR ASSEMBLY WITH AUXILIARY FRAME AND LENS ASSEMBLY

TECHNICAL FIELD OF INVENTION

The present invention relates to eyewear, and in particular, to an eyewear assembly that incorporates an auxiliary frame and lens assembly attachable to a primary lens assembly. More particularly, the present invention relates to a novel design and arrangement of the auxiliary lens assembly to the primary lens assembly.

BACKGROUND OF THE INVENTION

It has long been desirable to have a removable auxiliary lens assembly attached to eyeglasses. Typically, the auxiliary lenses provide some function not provided by the primary lenses. For example, the auxiliary lenses may be glare-reduction lenses (sunglasses), while the primary lenses are corrective. Various combinations are possible.

Conventionally, the auxiliary lens and frame assembly is removably secured to the primary assembly by any of a number of mechanical arrangements. The auxiliary assembly typically is forward or in front of the primary assembly, meaning the primary assembly is nearer or closer to the wearer's eyes. One drawback to this arrangement is that the auxiliary assembly can detract from the aesthetic appearance of the primary assembly, which is often purchased based on its aesthetic appearance. The purchase motivated by aesthetic appearance is particularly applicable to sunglasses with glare-reduction lenses.

U.S. Pat. No. 6,062,688, May 16, 2000, to Vinas discloses a safety shield assembly that is mounted between the primary frame of an eyewear assembly and the wearer's eyes. The purpose of the safety shield is to enclose the area between the wearer's face and the frame. The safety shield is formed of foam rubber to provide an air-permeable shield. This disclosure fails to provide an auxiliary lens assembly and, by its nature as a safety shield, is functional rather than aesthetic and actually detracts from the aesthetic appearance of the eyewear assembly.

A need exists, therefore, for improved means for attachment of auxiliary lens assemblies to primary lens assemblies that is both robust in its attachment, yet easily manufactured and permits breadth in design characteristics.

SUMMARY OF INVENTION

A primary advantage of the present invention is that it provides an arrangement for attachment of an auxiliary lens and frame assembly to a primary lens and frame assembly that does not interfere with the aesthetic appearance of the primary lens and frame assembly.

In accordance with one aspect of the invention, the eyewear assembly comprises a primary frame assembly having an outer periphery and a primary lens holder. At least one primary lens is carried by the primary lens holder. One of a pair of arms extends from a hinge at the outer periphery of the primary frame assembly. An auxiliary frame assembly has an outer periphery and an auxiliary lens holder. At least one auxiliary lens is carried by the auxiliary lens holder, wherein the auxiliary frame assembly is removably secured to the primary frame assembly between the hinges and arms, so that the auxiliary lens is maintained between the primary lens and an eye of the wearer.

In accordance with another aspect of the invention, the primary frame assembly is formed of polymeric material and the auxiliary frame assembly is formed of wire.

In accordance with another aspect of the invention, the primary frame assembly defines a forward aspect and the auxiliary frame assembly is entirely enclosed by the forward aspect.

In accordance with another aspect of the invention, the auxiliary frame assembly is removably secured to the primary frame assembly by magnetic engagement between ferromagnetic members carried by the primary and auxiliary assemblies.

In accordance with another aspect of the invention, the auxiliary lens is a corrective lens and the primary lens is a glare-reduction lens.

Other advantages of the present invention will become apparent from the following descriptions, taken in connection with the accompanying drawings, wherein, by way of illustration and example, an embodiment of the present invention is disclosed. As referred to herein, the "present invention" refers to one or more embodiments of the present invention which may or may not be claimed, and such references are not intended to limit the language of the claims, or to be used to construe the claims in a limiting manner.

DETAILED DESCRIPTION OF THE INVENTION

Figure 1:
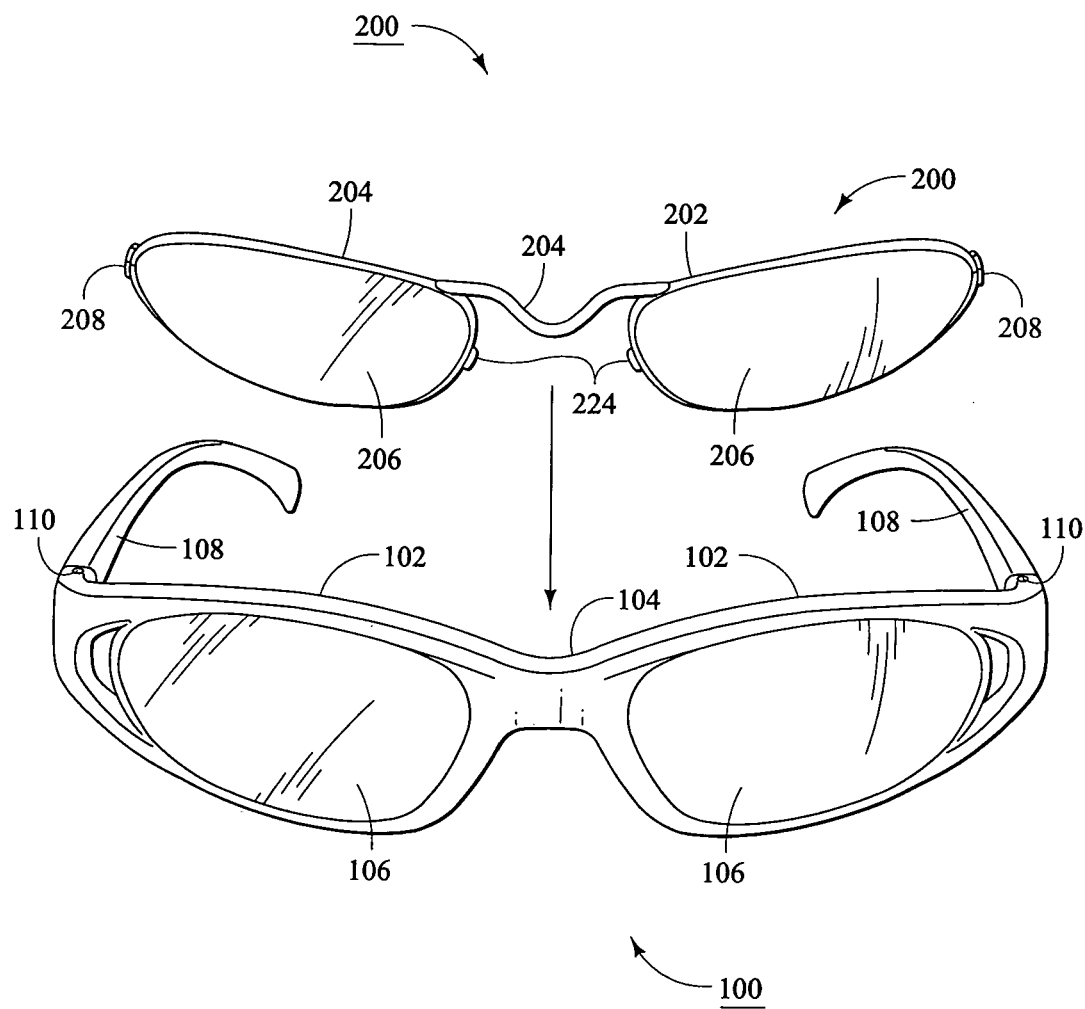
FIG. 1 is a front perspective exploded view of the eyewear assembly according to the present invention illustrating both the primary and auxiliary assemblies.
Figure 2:
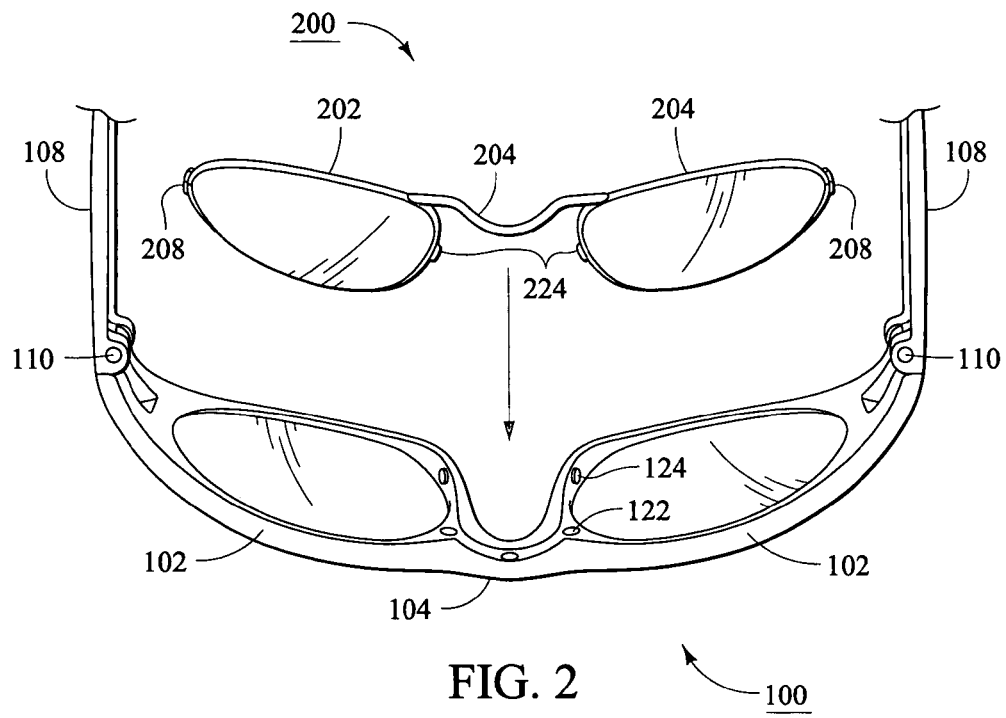
FIG. 2 is a rear perspective exploded view of the eyewear assembly according to the present invention illustrating both the primary and auxiliary assemblies.

Referring now to the FIGURES and particularly to FIG. 1, an eyewear assembly 100, 200 according to the present invention is shown. As illustrated in FIGS. 1 and 2, the eyewear assembly comprises a primary lens and frame assembly 100 to which is removably attached an auxiliary lens and frame assembly 200. Primary assembly 100 has a primary frame 102. A bridge 104 connects right and left portions of primary frame 102, each of which holds a primary lens 106, which may be a protective lens, corrective lens, or colored or glare-reducing lens. At the outer periphery of each lens, each end of frame 102 has an a temple or arm 108.

A hinge 110 connects each arm or temple 112 is connected to frame 102. Each arm 108 terminates in an earpiece (shown in FIGS. 1 and 2). Primary frame 102, bridge 104, and arms 108 cooperate to locate primary assembly 100 on the face of the wearer and to locate lenses 106 relative to one another and to the wearer's eyes. Preferably, as is indicated in the FIGURES, primary frame 100 is formed of molded polymer and is highly stylized to provide aesthetic appeal to the wearer and buyer. The polymeric material may be reinforced with wire or other metallic members. FIG. 1 illustrates the front or forward aspect of primary assembly 100, while FIGS. 2, 3, 4, and 5 depict the rearward aspect of the assembly, which is nearer the eyes of the wearer.

Figure 3:
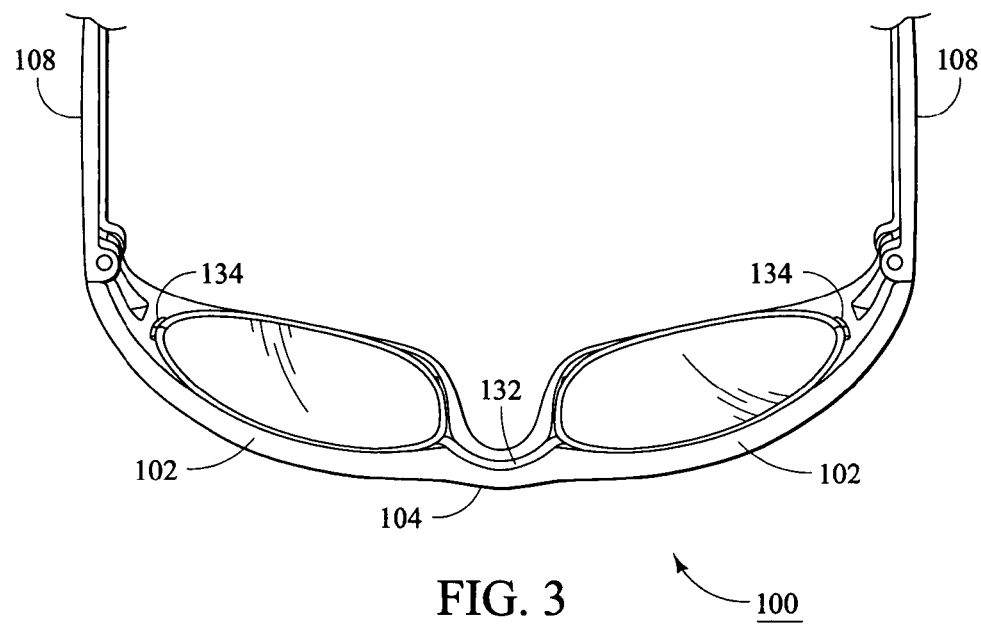
FIG. 3 is a rear perspective view of the primary assembly of the eyewear assembly according to the preferred embodiment of the present invention.
Figure 4:
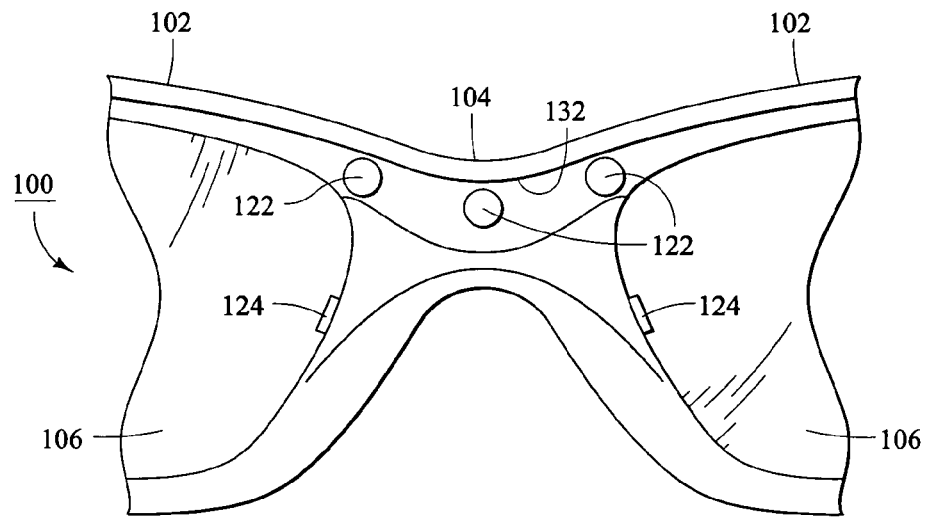
FIG. 4 is a rear, partial elevation view of a portion of the primary assembly illustrated in FIGS. 1, 2, and 3.

As shown in FIGS. 2 and 4, a plurality of ferromagnetic members, three 122 on bridge 104 and a pair 124 on nosepieces are located in primary frame 102 of primary assembly 100. Additionally, a groove 132 (FIGS. 3 and 4) is provided in bridge 104. A pair of notches 134 are provided in primary frame 102 near hinges 112 as shown in FIGS. 2 and 3. As will be described, ferromagnetic members 122, 124, groove 132, and notches 134 cooperate to secure and locate an auxiliary frame and lens assembly 200 relative to primary lens and frame assembly 100.

FIGS. 1 and 2 illustrate an auxiliary frame and lens assembly 200, which, like primary assembly 100, includes a frame of two portions 202, connected by a bridge 204, that hold a pair of auxiliary lenses 206. A pair of generally rectangular auxiliary extensions 208 are provided at the outer periphery of each end of frame 202. Preferably, auxiliary assembly 200, except for lenses 206, is formed of bent wire that is ferromagnetic, meaning it is capable of being attracted by a ferromagnet. At least bridge 204 is so constructed, it is not necessary that the entirety of auxiliary assembly be so formed. A pair of ferromagnetic members 224 are also secured by conventional means to the nosepieces of auxiliary assembly 200. All ferromagnetic members 122, 124, 224 are short cylinders having a diameter of between 0.0625 and 0.125 inch and a height or thickness less than 0.125 inch. They are conventionally secured to their respective locations by adhesives, solder, and the like.

Figure 5:
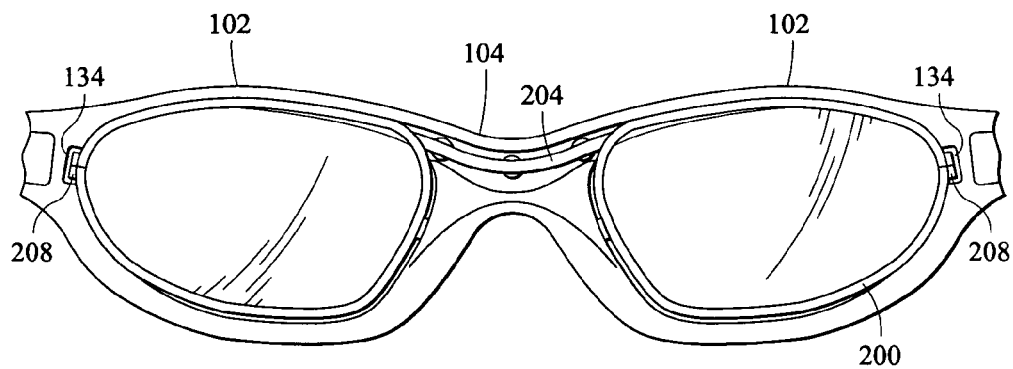
FIG. 5 is a rear perspective exploded view of the eyewear assembly according to the present invention illustrating both the primary and auxiliary assemblies assembled together.

FIG. 5 illustrates auxiliary assembly 200 removably secured to primary assembly 100. Bridge 204 of auxiliary assembly 200 is received in groove 132, which is dimensioned to permit bridge 204 to move in and out of groove 132, but small enough to restrain its movement to a degree. Auxiliary extensions 208 are received in notches 134 in primary assembly 100 and also serve to constrain auxiliary assembly 200 from undue movement (specifically "pivoting" about bridge 104, 204) relative to primary assembly 100.

Magnetic attraction between ferromagnets 122, 124 at bridge 104 and the nosepieces of primary assembly 100 and the ferromagnetic material of bridge 204 and ferromagnets 224 at the nosepieces associated with auxiliary assembly 200. Thus, auxiliary assembly 200 is removably secured to primary assembly 100 rearward and behind the forward aspect of primary assembly 100, between primary assembly 100 and the wearer's eyes. The forward aspect or periphery of primary assembly 100 fully encloses auxiliary assembly 200. Accordingly, it does not interfere with the aesthetic appearance of the forward aspect of primary assembly 100.

In operation, primary assembly 100 is employed by the wearer as the primary eyewear. When the extended functionality provided by auxiliary assembly 200 is desired or required, the wearer simply removes primary assembly 100 and "drops in" auxiliary assembly. Cooperation between extensions 208, bridge 204, and ferromagnets 224 of auxiliary assembly 200 and ferromagnets 122, 124, groove 132, and notches 134 removably secures auxiliary assembly 200 onto, and locates it relative to, primary assembly 100. The wearer then dons the entire assembly. The aesthetic forward aspect of primary assembly 100 remains unchanged.

The present invention has a number of advantages. The primary or principal advantage is that the functionality of the primary eyewear is extended by the auxiliary assembly, while the aesthetics of the primary eyewear are undisturbed by the presence or absence of the auxiliary assembly.

The invention has been described with reference to a preferred embodiment thereof. It is thus not limited, but is susceptible to variation and modification without departing from the scope and spirit of the invention.

I claim:

1. An eyewear assembly comprising:
    a primary frame assembly having an outer periphery and a primary lens holder;
    at least one primary lens carried by the primary lens holder;
    a pair of arms, each arm extending from a hinge at the outer periphery of the primary frame assembly;
    an auxiliary frame assembly having an outer periphery and an auxiliary lens holder;
    at least one auxiliary lens carried by the auxiliary lens holder; and
    wherein the auxiliary frame assembly is removably secured to the primary frame assembly by mechanical engagement between the auxiliary frame assembly and recesses formed in the primary frame assembly, and magnetic engagement between ferromagnetic members carried by, at least one of the primary and auxiliary assemblies wherein the auxiliary lens is maintained between the primary lens and an eye of the wearer.

2. The eyewear assembly according to claim 1, wherein the primary frame assembly is formed of polymeric material and the auxiliary frame assembly is formed of wire.

3. The eyewear assembly according to claim 1, wherein the primary frame assembly defines a forward aspect and the auxiliary frame assembly is entirely enclosed by the forward aspect.

4. The eyewear assembly according to claim 1, wherein the recesses include:
    a groove formed in a bridge portion of the primary frame assembly; and
    a notch formed in the primary frame assembly proximal each hinge, wherein a bridge of the auxiliary frame engages the groove, and a pair of extensions on the outer periphery auxiliary frame assembly engages the notch.

5. The eyewear assembly according to claim 1, wherein the auxiliary lens is a corrective lens and the primary lens is a glare-reduction lens.

6. An eyewear assembly comprising:
    a primary frame assembly having an outer periphery and a primary lens holder;
    at least one primary lens carried by the primary lens holder;
    an auxiliary frame assembly having an outer periphery and an auxiliary lens holder;
    at least one auxiliary lens carried by the auxiliary lens holder; and
    wherein the auxiliary frame assembly is removably secured to the primary frame assembly by magnetic engagement between ferromagnetic members carried by at least one of the primary and auxiliary assemblies and by mechanical engagement between recesses formed in the primary frame assembly and projections formed in the auxiliary frame assembly, wherein the auxiliary frame assembly is maintained between the primary frame assembly and the eyes of the wearer, wherein the outer periphery of the primary frame assembly substantially contains the outer periphery of the auxiliary frame assembly.

7. The eyewear assembly according to claim 6, wherein the primary frame assembly is formed of polymeric material and the auxiliary frame assembly is formed of wire.

8. The eyewear assembly according to claim 6, wherein the primary frame assembly defines a forward aspect and the auxiliary frame assembly is entirely enclosed by the forward aspect.

9. The eyewear assembly according to claim 6, wherein the recesses and projections include:
   a groove formed in a bridge portion of the primary frame assembly;
   a notch formed in the primary frame assembly proximal each hinge; and
   a pair of extensions formed on the outer periphery of the auxiliary frame assembly, wherein a bridge of the auxiliary frame engages the groove, and the extensions on the auxiliary frame assembly engage each notch.

10. The eyewear assembly according to claim 6, wherein the auxiliary lens is a corrective lens and the primary lens is a glare-reduction lens.

11. An eyewear assembly comprising:
   a primary frame assembly including a primary lens holder, the primary frame assembly including at least one recess;
   at least one primary lens carried by the primary lens holder, the primary frame assembly defining a forward aspect;
   an auxiliary frame assembly having an outer periphery and an auxiliary lens holder, the primary frame assembly including at least one extension;
   at least one auxiliary lens carried by the auxiliary lens holder; and
   wherein the auxiliary frame assembly is removably secured to the primary frame assembly by magnetic engagement between ferromagnetic members carried by the primary and auxiliary assemblies and by mechanical engagement between the recess and the extension, wherein the auxiliary frame assembly is maintained between the primary frame assembly and the eyes of the wearer, and the forward aspect of the primary frame assembly encloses the outer periphery of the auxiliary frame assembly.

12. The eyewear assembly according to claim 11, wherein the primary frame assembly is formed of polymeric material and the auxiliary frame assembly is formed of wire.

13. The eyewear assembly according to claim 11, wherein the recess and extension further comprises:
   a groove formed in a bridge portion of the primary frame assembly;
   a notch formed in the primary frame assembly proximal each hinge; and
   a pair of extensions formed on the outer periphery of the auxiliary frame assembly, wherein a bridge of the auxiliary frame engages the groove, and the extensions on the auxiliary frame assembly engage each notch.

14. The eyewear assembly according to claim 11, wherein the auxiliary lens is a corrective lens and the primary lens is a glare-reduction lens.

* * * * *